US012586837B2

(12) United States Patent
Park et al.

(10) Patent No.: US 12,586,837 B2
(45) Date of Patent: Mar. 24, 2026

(54) BATTERY MODULE AND BATTERY PACK INCLUDING THE SAME

(71) Applicant: LG ENERGY SOLUTION, LTD., Seoul (KR)

(72) Inventors: Subin Park, Daejeon (KR); Junyeob Seong, Daejeon (KR); Won Kyoung Park, Daejeon (KR); Honggoo Han, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 560 days.

(21) Appl. No.: 18/019,643

(22) PCT Filed: Jan. 7, 2022

(86) PCT No.: PCT/KR2022/000283
§ 371 (c)(1),
(2) Date: Feb. 3, 2023

(87) PCT Pub. No.: WO2022/149899
PCT Pub. Date: Jul. 14, 2022

(65) Prior Publication Data
US 2023/0291025 A1    Sep. 14, 2023

(30) Foreign Application Priority Data
Jan. 11, 2021    (KR) ........................ 10-2021-0003182

(51) Int. Cl.
*H01M 10/653* (2014.01)
*H01M 10/04* (2006.01)
(Continued)

(52) U.S. Cl.
CPC ..... *H01M 10/653* (2015.04); *H01M 10/0481* (2013.01); *H01M 10/647* (2015.04);
(Continued)

(58) Field of Classification Search
CPC ............. H01M 10/653; H01M 10/647; H01M 50/242; H01M 50/211
See application file for complete search history.

(56) References Cited

U.S. PATENT DOCUMENTS

2010/0215999 A1 *   8/2010   Yoon ................... H01M 10/643
                                                                    429/90
2014/0087231 A1     3/2014   Schaefer et al.
(Continued)

FOREIGN PATENT DOCUMENTS

CN         202721242 U        2/2013
CN         103518274 A        1/2014
(Continued)

OTHER PUBLICATIONS

European Communication pursuant to Article 94(3) EPC for European Application No. 22736876.8, dated Jun. 10, 2025.
(Continued)

*Primary Examiner* — Olatunji A Godo
(74) *Attorney, Agent, or Firm* — Birch, Stewart, Kolasch & Birch, LLP

(57) ABSTRACT

A battery module includes a battery cell stack including a plurality of battery cells stacked in a first direction; an exterior member configured to surround front and rear sides and two opposite lateral sides of the battery cell stack; and sensing blocks positioned at front and rear sides of the battery cell stack, in which the sensing blocks are positioned between the exterior member and the front and rear sides of the battery cell stack, and in which upper and lower sides of the battery cell stack are exposed.

18 Claims, 11 Drawing Sheets

(51) Int. Cl.
  *H01M 10/647* (2014.01)
  *H01M 50/211* (2021.01)
  *H01M 50/242* (2021.01)
(52) U.S. Cl.
  CPC ....... *H01M 50/211* (2021.01); *H01M 50/242* (2021.01); *H01M 2220/20* (2013.01)

(56) References Cited

U.S. PATENT DOCUMENTS

| | | | |
|---|---|---|---|
| 2015/0037647 A1* | 2/2015 | Nguyen | ............ H01M 10/6555 429/120 |
| 2019/0305268 A1 | 10/2019 | Ryu et al. | |
| 2019/0334141 A1* | 10/2019 | Kwon | ............... H01M 10/6563 |
| 2020/0067040 A1 | 2/2020 | Kim et al. | |
| 2020/0176745 A1 | 6/2020 | Lee | |
| 2020/0343499 A1 | 10/2020 | Yoo et al. | |
| 2021/0175572 A1 | 6/2021 | He et al. | |
| 2021/0249725 A1 | 8/2021 | He et al. | |
| 2021/0265685 A1 | 8/2021 | Jeong et al. | |
| 2021/0344057 A1 | 11/2021 | Seo et al. | |
| 2022/0102787 A1 | 3/2022 | He et al. | |
| 2022/0118840 A1 | 4/2022 | He et al. | |
| 2022/0118841 A1 | 4/2022 | He et al. | |
| 2022/0123404 A1 | 4/2022 | He et al. | |
| 2022/0126666 A1 | 4/2022 | He et al. | |
| 2022/0126705 A1 | 4/2022 | He et al. | |
| 2022/0158270 A1 | 5/2022 | Lee et al. | |
| 2023/0216122 A1 | 7/2023 | Hou et al. | |
| 2023/0307739 A1 | 9/2023 | Park et al. | |
| 2023/0318059 A1 | 10/2023 | Han et al. | |
| 2023/0318060 A1 | 10/2023 | Han et al. | |
| 2023/0352783 A1 | 11/2023 | He et al. | |
| 2023/0387530 A1 | 11/2023 | Park et al. | |
| 2024/0128565 A1 | 4/2024 | He et al. | |
| 2024/0204318 A1 | 6/2024 | He et al. | |
| 2024/0222760 A1 | 7/2024 | He et al. | |
| 2024/0222761 A1 | 7/2024 | He et al. | |
| 2024/0222762 A1 | 7/2024 | He et al. | |
| 2024/0222763 A1 | 7/2024 | He et al. | |
| 2024/0222764 A1 | 7/2024 | He et al. | |
| 2024/0222767 A1 | 7/2024 | He et al. | |
| 2024/0250359 A1 | 7/2024 | He et al. | |
| 2024/0347831 A1 | 10/2024 | He et al. | |
| 2025/0167361 A1 | 5/2025 | He et al. | |

FOREIGN PATENT DOCUMENTS

| | | |
|---|---|---|
| CN | 108463903 A | 8/2018 |
| CN | 110165113 A | 8/2019 |
| CN | 209401761 U | 9/2019 |
| JP | 2003-59465 A | 2/2003 |
| JP | 2010-244894 A | 10/2010 |
| JP | 5418536 B2 | 2/2014 |
| JP | 2019-106275 A | 6/2019 |
| JP | 2023-535947 A | 8/2023 |
| JP | 2023-536453 A | 8/2023 |
| JP | 2023-538576 A | 9/2023 |
| JP | 2023-543748 A | 10/2023 |
| KR | 10-2014-0016326 A | 2/2014 |
| KR | 10-2014-0141825 A | 12/2014 |
| KR | 10-1587312 B1 | 1/2016 |
| KR | 10-2016-0049863 A | 5/2016 |
| KR | 10-2017-0066896 A | 6/2017 |
| KR | 10-1826861 B1 | 2/2018 |
| KR | 10-2018-0068379 A | 6/2018 |
| KR | 10-2018-0085664 A | 7/2018 |
| KR | 10-1929529 B1 | 12/2018 |
| KR | 10-2019-0054709 A | 5/2019 |
| KR | 10-2020-0004186 A | 1/2020 |
| KR | 10-2020-0086172 A | 7/2020 |
| KR | 10-2021-0000551 A | 1/2021 |
| WO | WO 2020/262812 A1 | 12/2020 |

OTHER PUBLICATIONS

International Search Report (PCT/ISA/210) issued in PCT/KR2022/000283, dated May 3, 2022.
Extended European Search Report for European Application No. 22736876.8, dated Jul. 22, 2024.

* cited by examiner

【Figure 1】
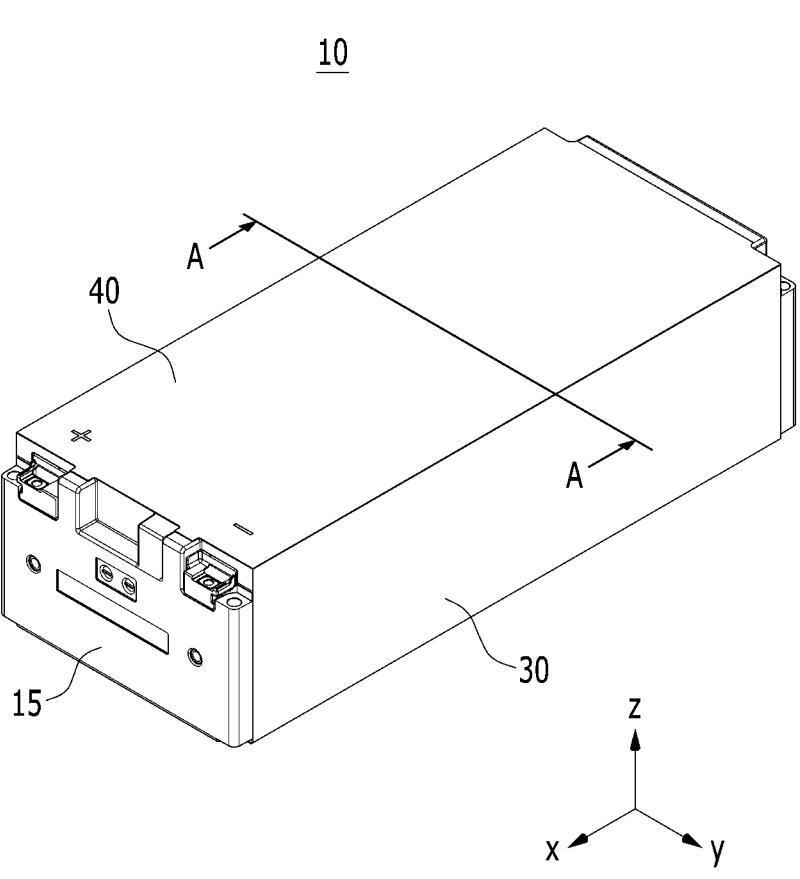

[Figure 2]
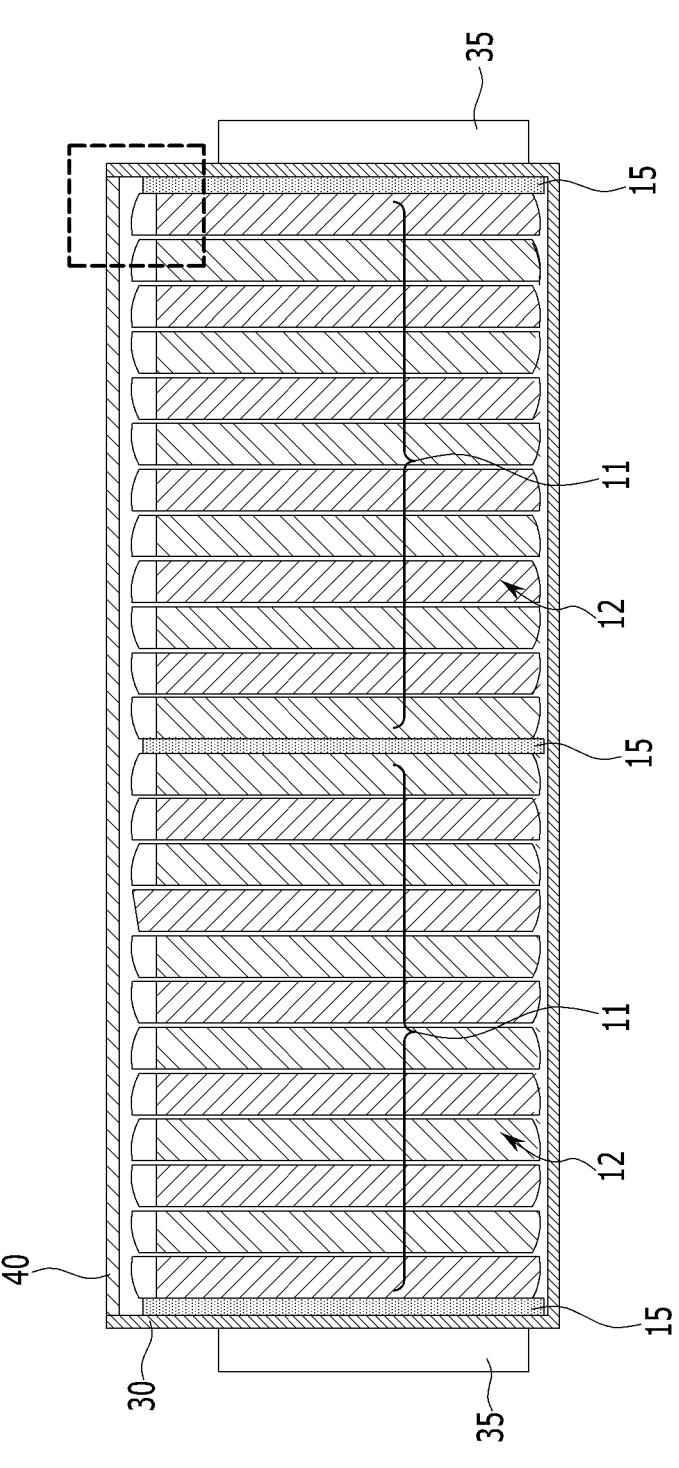

【Figure 3】
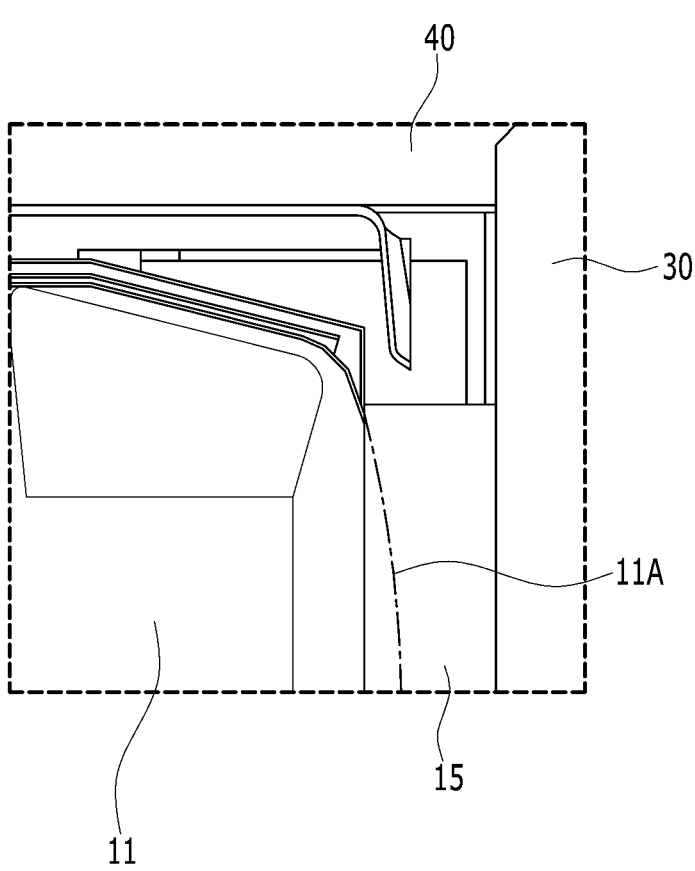

[Figure 4]
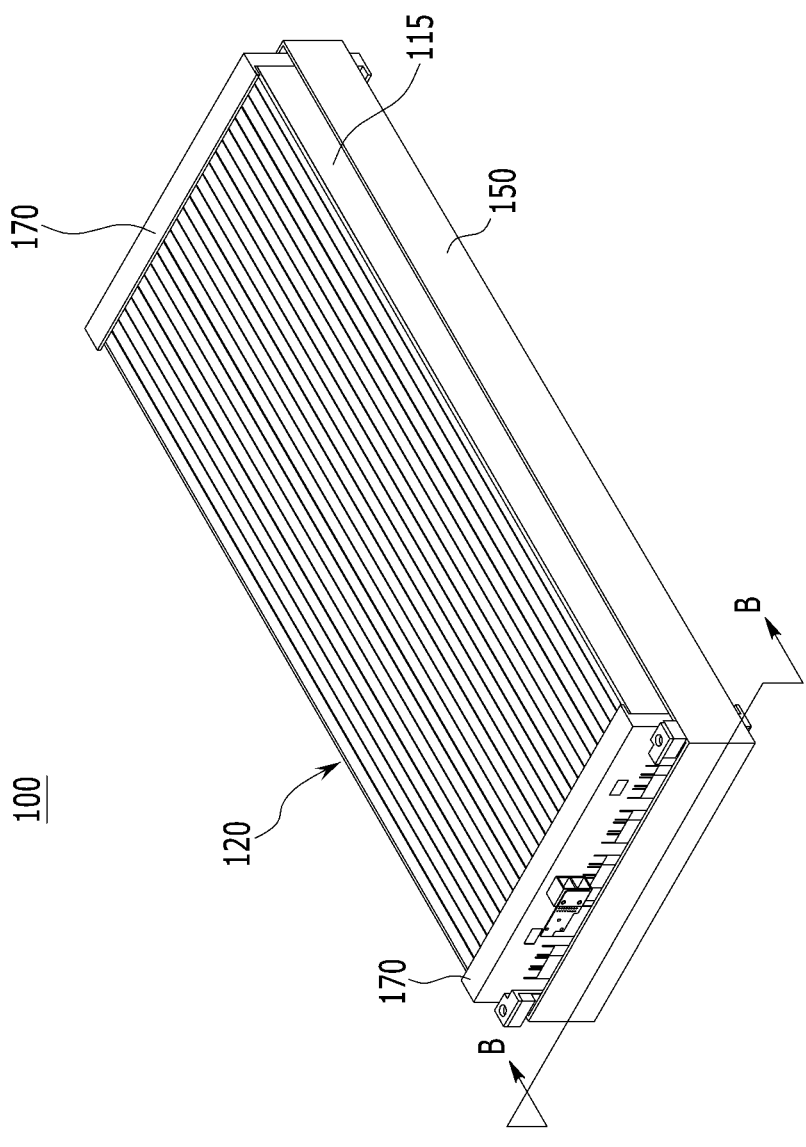

[Figure 5]
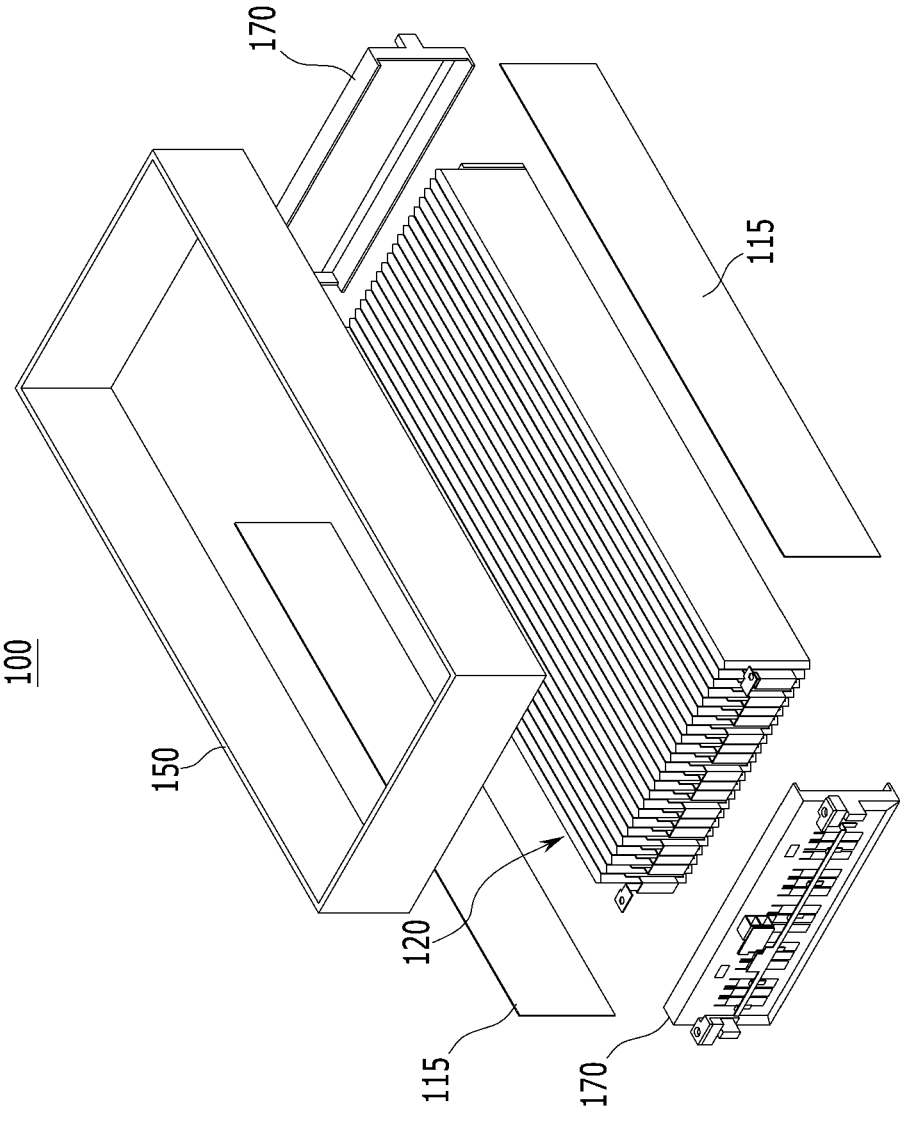

【Figure 6】
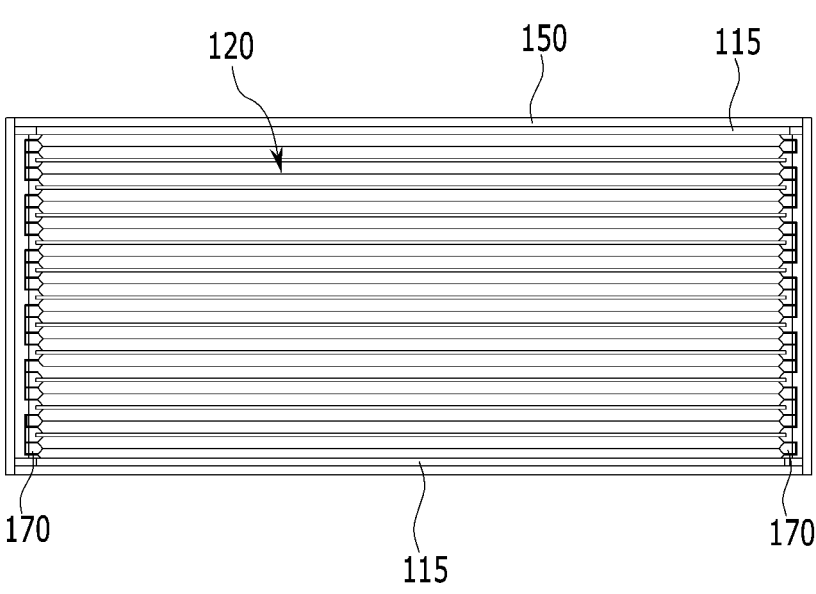

[Figure 7]
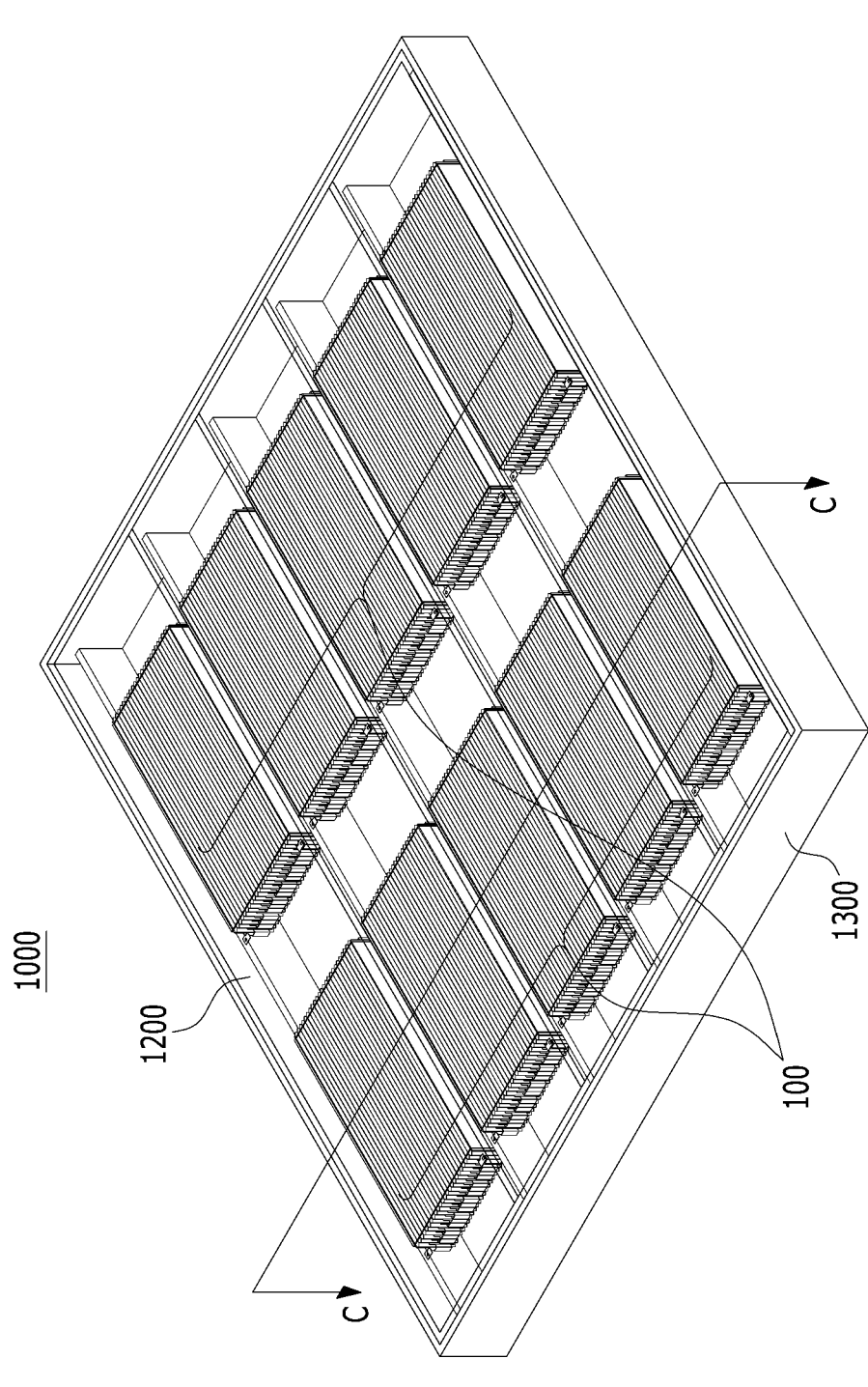

【Figure 8】
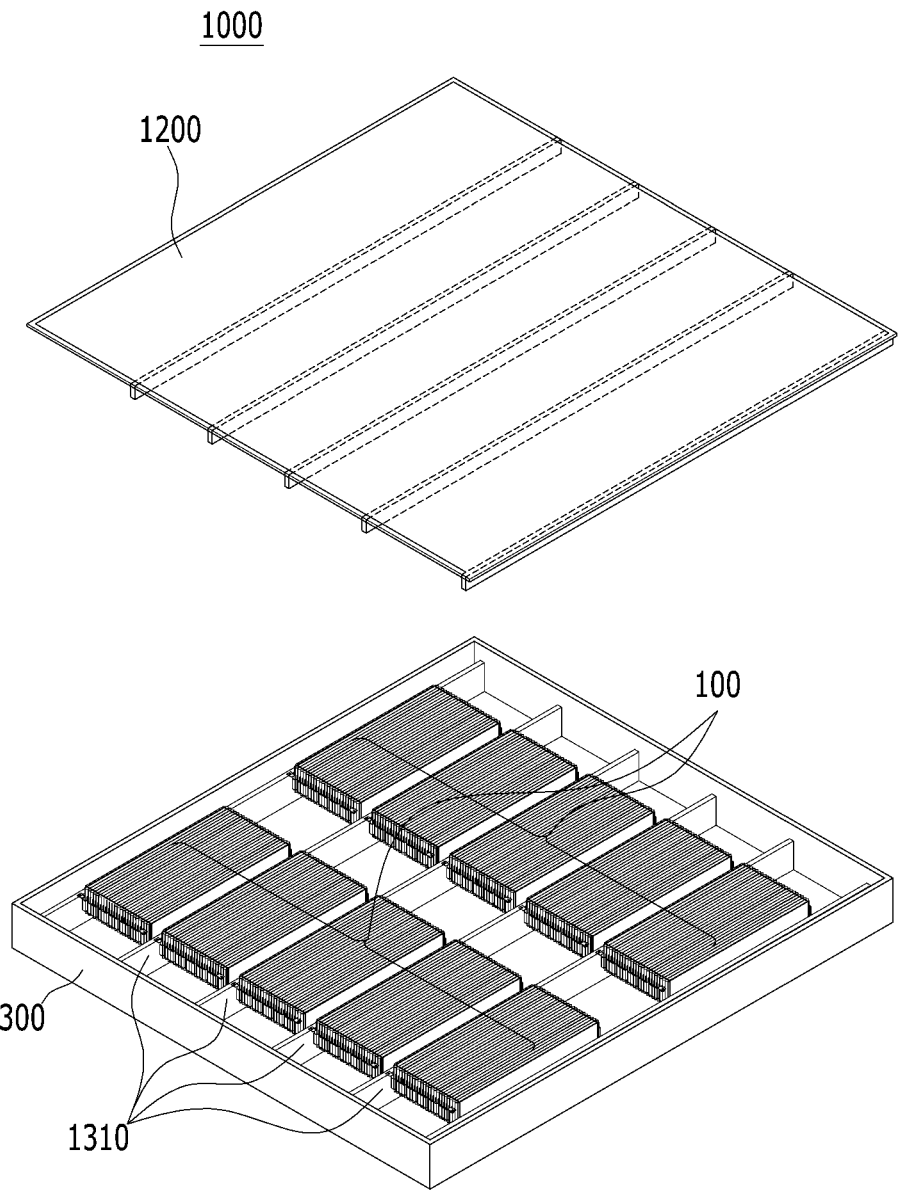

【Figure 9】
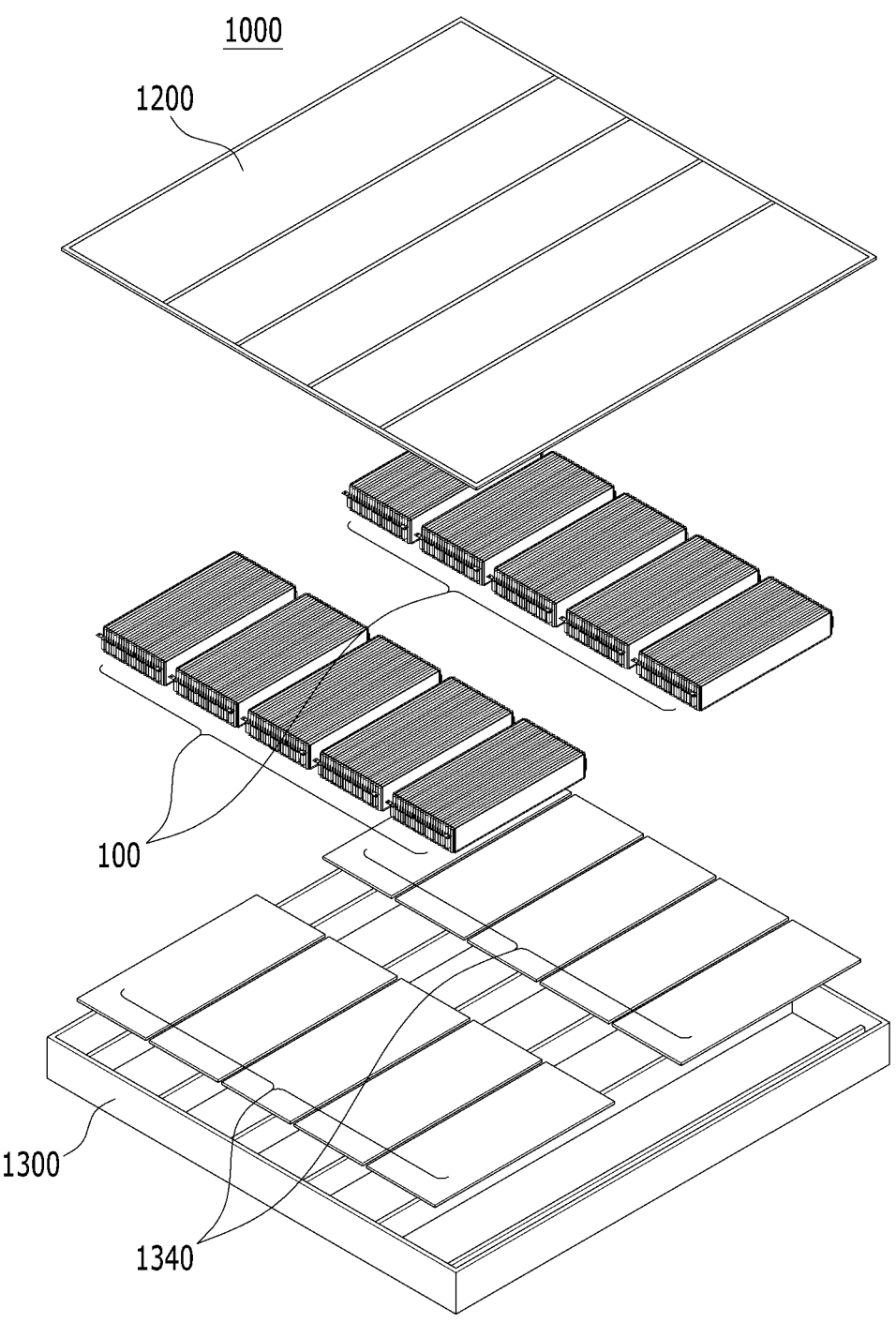

【Figure 10】
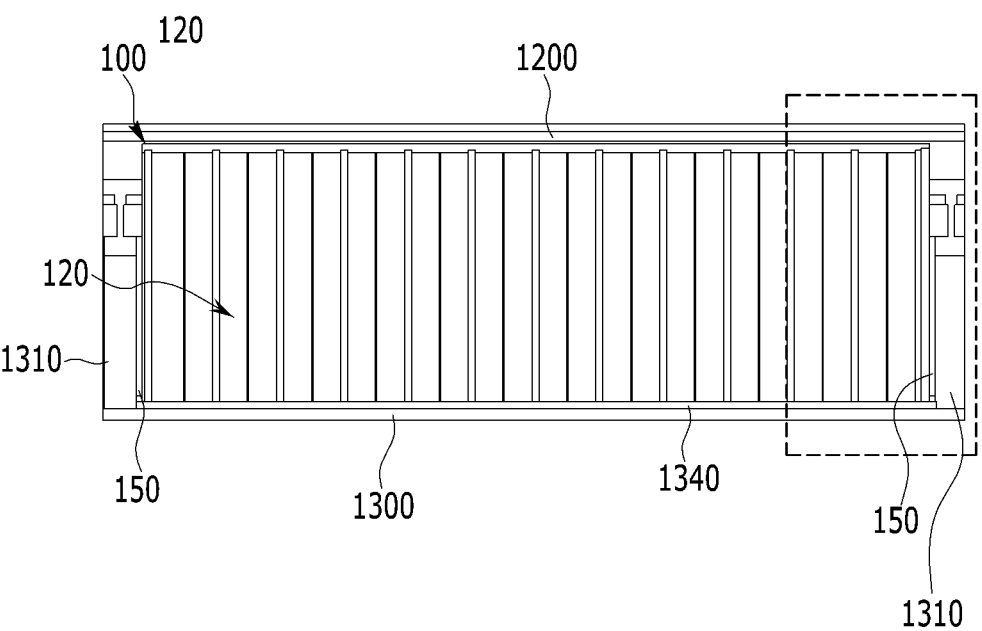

【Figure 11】
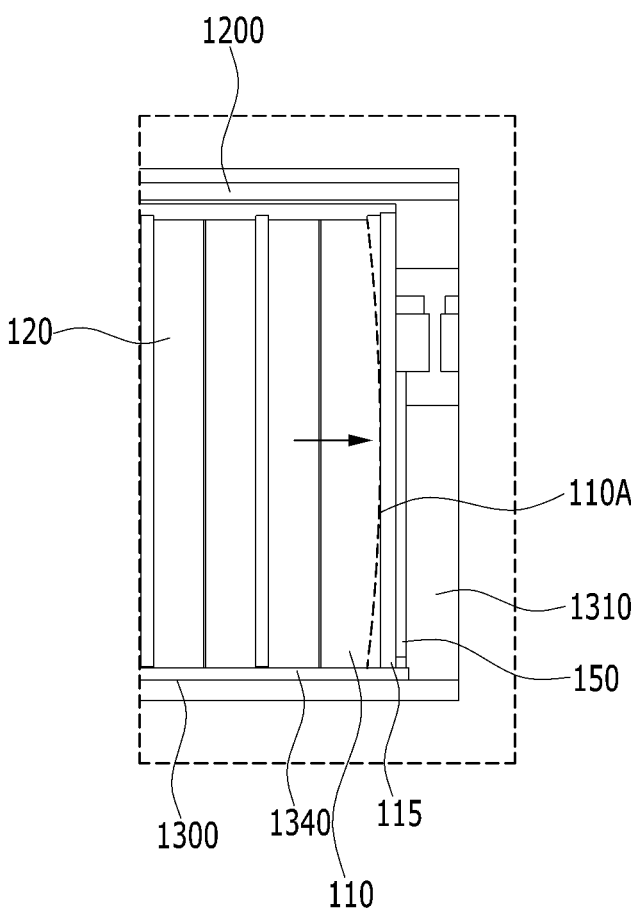

BATTERY MODULE AND BATTERY PACK INCLUDING THE SAME

CROSS-REFERENCE TO RELATED APPLICATION(S)

This application claims priority to and the benefit of Korean Patent Application No. 10-2021-0003182 filed in the Korean Intellectual Property Office on Jan. 11, 2021, the entire contents of which are incorporated herein by reference.

TECHNICAL FIELD

The present invention relates to a battery module and a battery pack including the same, and more particularly, to a battery module and a battery pack including the same, which have improved cooling performance and prevent a battery cell from swelling.

BACKGROUND ART

As development of technologies and demands for mobile devices are increased, there is a rapidly increasing demand for rechargeable batteries as energy sources. The rechargeable battery is attracting lots of interest as an energy source for a power device such as an electric bicycle, an electric vehicle, and a hybrid electric vehicle as well as a mobile device such as a mobile phone, a digital camera, a notebook computer, and a wearable device.

One or two or more battery cells are used for one small-scale mobile device, whereas a high-output, high-capacity battery module is required for a middle-scale or large-scale device such as a vehicle. Therefore, a middle-scale or large-scale battery module made by electrically connecting a plurality of battery cells is used.

The middle-scale or large-scale battery module needs to be manufactured to be small in size and light in weight if possible. Therefore, an angular battery or a pouch-type battery is mainly used as a battery cell for the middle-scale or large-scale battery module. The angular battery or the pouch-type battery may be stacked with a high degree of integration and have a small weight despite a large capacity. Meanwhile, the battery module may include a module frame having an internal space that accommodates a battery cell stack to protect the battery cell stack from external impact, heat, or vibration. The module frame is opened at front and rear sides thereof.

FIG. 1 is a perspective view of a battery module in the related art. FIG. 2 is a view illustrating a cross-section taken along cutting line A-A in FIG. 1. FIG. 3 is an enlarged view of a part of FIG. 3.

Referring to FIGS. 1 to 3, a battery module 10 in the related art includes a battery cell stack 12 made by stacking a plurality of battery cells 11 in one direction, module frames 30 and 40 configured to accommodate the battery cell stack 12, endplates 50 configured to cover front and rear sides of the battery cell stack 12, and busbar frames (not illustrated) provided between the endplates 50 and the front and rear sides of the battery cell stack 12.

The module frames 30 and 40 may include an upper plate 40 and a lower frame 30 opened at front and rear sides and an upper side thereof. Mounting parts 35 may be provided at two opposite lateral sides of the lower frame 30. In this case, the battery module 10 is fixed to a pack frame of a battery pack by means of mounting bolts inserted into the mounting parts 35. However, because this configuration requires separate fixing members, there is a problem in that this configuration is disadvantageous in terms of costs, and a battery density is decreased by a space occupied by the fixing member.

The battery module 10 is configured such that compressive pads 15 are attached to two opposite lateral sides of the battery cell stack 12, and then the battery cell stack 12 is mounted on the lower frame 30 in a state in which the two opposite lateral sides of the battery cell stack 12 are pressed. Therefore, a separate pressing process of pressing the battery cell stack 12 is required to manufacture the battery module 10 in the related art, which complicates a process and a production line.

In addition, referring to FIG. 3, the battery cell 11 swells by being deformed (11A) in a width direction during the process of charging or discharging the battery cell 11. However, in general, the compressive pad 15 has a limitation in absorbing deformation in a width direction of the battery module 10. In particular, the battery cell 11 is repeatedly expanded and contracted during the process of charging or discharging the battery cell 11. If the deformation of the battery module 10 in the width direction is not sufficiently absorbed during this process, the battery module also swells, and the module frame is also deformed. Accordingly, there is a need for the development of a battery module, which is manufactured by a comparatively simple process, cooled with improved cooling performance, and configured to sufficiently absorb deformation of the battery cell caused by the expansion and contraction of the battery cell.

DISCLOSURE

Technical Problem

The present invention has been made in an effort to provide a battery module and a battery pack including the same, which have improved cooling performance and prevent a battery cell from swelling.

The objects to be solved by the present invention are not limited to the above-mentioned objects, and other objects, which are not mentioned above, may be clearly understood by those skilled in the art from the present specification and the accompanying drawings.

Technical Solution

An exemplary embodiment of the present invention provides a battery module including: a battery cell stack including a plurality of battery cells stacked in a first direction; an exterior member configured to surround a front side and a rear side and two opposite lateral sides of the battery cell stack; and sensing blocks positioned at the front side and the rear side of the battery cell stack, in which the sensing blocks are positioned between the exterior member and the front side and the rear side of the battery cell stack, and in which an upper side and a lower side of the battery cell stack are exposed.

An outer surface of the exterior member may be exposed.

A width of the exterior member may be equal to or smaller than a width of the battery cell stack.

The exterior member may be positioned adjacent to a lower portion of the battery cell stack.

The exterior member may be made of an elastic material.

The exterior member may be formed by wrapping the front side, the rear side and the two opposite lateral sides of the battery cell stack with a film made of an elastic material.

The exterior member may be configured as a thermal contraction tube, and the thermal contraction tube may be opened at upper and lower sides thereof.

Compressive pads may be positioned between the exterior member and the two opposite lateral sides of the battery cell stack.

The compressive pads may extend along the lateral side of the battery cell stack.

Another exemplary embodiment of the present invention provides a battery pack including: a pack frame on which at least two battery modules are mounted, in which the pack frame includes: a lower pack frame on which the at least two battery modules are mounted; and an upper pack frame configured to cover upper portions of the at least two battery modules.

The lower pack frame may include a plurality of module regions in which the at least two battery modules are mounted, and the plurality of module regions may be defined by a plurality of beams extending from a first side toward a second side of the lower pack frame.

An outer surface of the exterior member may contact with the beam.

Thermally conductive resin layers may be respectively formed in the module regions.

A lower surface of the battery cell stack may contact with the thermally conductive resin layer.

Advantageous Effects

According to the embodiments of the present invention, it is possible to provide the battery module and the battery pack including the same, in which the exterior member surrounds the front and rear sides and the two opposite lateral sides of the battery cell stack, thereby improving the cooling performance and preventing the battery cell from swelling.

The effects of the present invention are not limited to the above-mentioned effects, and other effects, which are not mentioned above, may be clearly understood by those skilled in the art from the present specification and the accompanying drawings.

DESCRIPTION OF THE DRAWINGS

FIG. 1 is a perspective view of a battery module in the related art.

FIG. 2 is a view illustrating a cross-section taken along cutting line A-A in

FIG. 1.

FIG. 3 is an enlarged view of a part of FIG. 3.

FIG. 4 is a perspective view of a battery module according to an embodiment of the present invention.

FIG. 5 is an exploded perspective view of the battery module in FIG. 4.

FIG. 6 is a view illustrating a cross-section taken along cutting line B-B in FIG. 4.

FIG. 7 is a perspective view of a battery pack according to another embodiment of the present invention.

FIG. 8 is an exploded perspective view of an upper pack frame of the battery pack in FIG. 7.

FIG. 9 is an exploded perspective view of components of the battery pack in FIG. 7.

FIG. 10 is a view illustrating a part of a cross-section taken along cutting line C-C in FIG. 7.

FIG. 11 is an enlarged view of a part of FIG. 10.

MODE FOR INVENTION

Hereinafter, several exemplary embodiments of the present invention will be described in detail with reference to the accompanying drawings so that those with ordinary skill in the art to which the present invention pertains may easily carry out the exemplary embodiments. The present invention may be implemented in various different ways and is not limited to the embodiments described herein.

A part irrelevant to the description will be omitted to clearly describe the present invention, and the same or similar constituent elements will be designated by the same reference numerals throughout the specification.

In addition, a size and a thickness of each constituent element illustrated in the drawings are arbitrarily shown for convenience of description, but the present invention is not limited thereto. In order to clearly describe several layers and regions, thicknesses thereof are enlarged in the drawings. In the drawings, the thicknesses of some layers and regions are exaggerated for convenience of description.

In addition, throughout the specification of the present application, unless explicitly described to the contrary, the word "comprise" or "include" and variations, such as "comprises", "comprising", "includes" or "including", will be understood to imply the inclusion of stated constituent elements, not the exclusion of any other constituent elements.

Throughout the specification, the word "in a plan view" means when an object is viewed from above, and the word "in a cross-sectional view" means when a cross section made by vertically cutting an object is viewed from a lateral side.

Hereinafter, a battery module according to an embodiment of the present invention will be described. However, in this case, the battery module will be described, focusing on a front side of the battery module between the front and rear sides of the battery module. However, the present invention is not necessarily limited thereto. The same or similar contents may be applied to the rear side of the battery module.

FIG. 4 is a perspective view of the battery module according to the embodiment of the present invention. FIG. 5 is an exploded perspective view of the battery module in FIG. 4. FIG. 6 is a view illustrating a cross-section taken along cutting line B-B in FIG. 4.

Referring to FIGS. 4 and 6, a battery module 100 according to the present embodiment includes: a battery cell stack 120 including a plurality of battery cells 110 stacked in a first direction; an exterior member 150 configured to surround front and rear sides and two opposite lateral sides of the battery cell stack 120; and sensing blocks 170 positioned at the front and rear sides of the battery cell stack 120.

The battery cell stack 120 surrounded by the exterior member 150 is configured by stacking the plurality of battery cells 110. The battery cell 110 may be a pouch-type battery cell. The battery cell 110 may be manufactured by accommodating an electrode assembly in a pouch casing of a laminated sheet including a resin layer and a metal layer, and then thermally bonding a sealing part of the pouch casing. The battery cell 110 may be provided in plural, and the plurality of battery cells 110 are stacked to be electrically connected to one another, thereby constituting the battery cell stack 120.

Referring to FIGS. 5 and 6, the sensing blocks 170 may be positioned between the exterior member 150 and the front and rear sides of the battery cell stack 120. In this case, the sensing blocks 170 respectively cover the front and rear sides of the battery cell stack 120 from which electrode leads (not illustrated) protrude. In addition, the sensing block 170 may be provided in the form of a basket. The sensing blocks 170 may respectively cover the front and rear sides of the battery cell stack 200. In this case, one or more slits (not illustrated) may be formed in the sensing block 170. When the sensing block 170 is disposed, the electrode leads (not illustrated) of the battery cells 110 pass through the slits, thereby constituting an electrode lead assembly.

Therefore, the exterior member 150 may surround the sensing blocks 170 positioned at the front and rear sides of the battery cell stack 120. Therefore, the battery module 100 according to the present embodiment may ensure the performance in insulating the electrode lead assembly formed by passing through the slits of the sensing blocks 170.

For example, the sensing block 170 may be made of an electrically insulating material, e.g., a plastic material, a polymer material, or a composite material. However, the present invention is not limited thereto. Any material may be applied without limitation as long as the material has rigidity capable of forming the one or more slits and has electrical insulation.

Referring to FIGS. 4 to 6, the exterior member 150 may surround an outer surface of the battery cell stack 120. In this case, the exterior member 150 may be a member having two opposite lateral sides and front and rear sides and be opened at upper and lower sides thereof. That is, the two opposite lateral sides and the front and rear sides of the battery cell stack 120 may be surrounded by the exterior member 150 and opened at upper and lower sides thereof. In other words, the upper and lower sides of the battery cell stack 120 may be exposed.

For example, the exterior member 150 may be made of an elastic material. The elastic material may be made of at least any one of the materials such as polyethylene (PE) or polytetrafluoroethylene (PTFE). In this case, the exterior member 150 may be formed by wrapping the outer surface of the battery cell stack with a film or thermal contraction tube made of an elastic material. In this case, the thermal contraction tube may be opened at upper and lower sides thereof. However, the present invention is not limited thereto. Any material may be applied without limitation as long as the material may have elasticity capable of effectively absorbing external impact and sufficiently pressing the battery cells 110 included in the battery cell stack 120.

Therefore, in the present embodiment, the exterior member 150 may prevent swelling of the battery cell and improve the dimensional stability of the battery module. In addition, because the exterior member 150 has elasticity, it is possible to minimize the deformation of the exterior member 150 caused by a change in volume of the battery cell 110.

In addition, the two opposite lateral sides and the front and rear sides of the exterior member 150 may correspond in size to the outer surface of the battery cell stack before the exterior member 150 surrounds the battery cell stack 120. For example, the two opposite lateral sides of the exterior member 150 may each be equal in size to the lateral side of the battery cell stack 120 or have a smaller size than the lateral side of the battery cell stack 120. In addition, the front and rear sides of the exterior member 150 may each be equal in size to each of the upper and lower sides of the battery cell stack 120 or have a smaller size than each of the upper and lower sides of the battery cell stack 120.

Therefore, in the present embodiment, the exterior member 150 may surround the battery cell stack 120 while pressing the battery cell stack 120 in a predetermined direction. That is, the exterior member 150 may press the battery cells 110 included in the battery cell stack 120 in the predetermined direction, which makes it possible to prevent swelling of the battery cell and improve the dimension stability of the battery module. In addition, the battery cell stack 120 may be pressed during the process in which the battery cell stack 120 is surrounded by the exterior member 150. Therefore, a separate process of pressing the battery cell stack 120 is not required, which makes it possible to simplify the process and production line.

In addition, the exterior member 150 may be equal in width to the battery cell 120 or have a smaller width than the battery cell 120. For example, the exterior member 150 may be positioned adjacent to a lower portion of the battery cell stack 120. Therefore, in the present embodiment, it is possible to minimize an area of the exterior member 150, prevent swelling of the battery cell, and improve the dimensional stability of the battery module.

In addition, an outer surface of the exterior member 150 may be exposed in the state in which the exterior member 150 surrounds the battery cell stack 120. That is, the exterior member 150 may be in contact with pack frames 1200 and 1300 when the battery module 100 is mounted on the pack frames 1200 and 1300 of the battery pack 1000 during a process to be described below.

Therefore, in the present embodiment, the exterior member 150 may replace the module frames 30 and 40 of the battery module 10 in the related art, which makes it possible to improve efficiency in process and costs.

In addition, the outer surface of the battery cell stack 120 may be attached to an inner surface of the exterior member 150. In this case, the elastic material contained in the exterior member 150 may have a bonding force itself. In addition, the exterior member 150 and the battery cell stack 120 may be fixed to each other by means of a frictional force between the inner surface of the exterior member 150 and the outer surface of the battery cell stack 120. In addition, a separate bonding layer may be provided between the exterior member 150 and the battery cell stack 120.

For example, the bonding layer may be provided in the form of a tape or coated with a bondable binder. More particularly, the bonding layer may be coated with a bondable binder or provided in the form of a double-sided tape, such that the battery cell stack 120 and the exterior member 150 may be easily fixed. However, the present invention is not limited thereto. Any material may be applied without limitation as long as the material has bondability capable of fixing the battery cells 110 or fixing the battery cell 110 and the exterior member 150.

Therefore, the battery cell stack 120 may be stably accommodated in the exterior member 150.

Referring to FIGS. 4 to 6, a compressive pad 115 may be positioned between the exterior member 150 and the outer surface of the battery cell stack 120. In this case, the compressive pad 115 may extend along the outer surface of the battery cell stack 120. In addition, the compressive pad 115 may be equal in size to the outer surface of the battery cell stack 120 or have a smaller size than the outer surface of the battery cell stack 120.

For example, the compressive pad 115 may be a pad made of polyurethane. However, the present invention is not limited thereto. Any material may be applied as long as the material may absorb a change in volume when the battery cell 110 expands.

Therefore, the compressive pad 115 may easily absorb the expansion of the battery cell 110 included in the battery cell stack 120 and assist the exterior member 150 in pressing the outer surface of the battery cell stack 120.

In addition, the compressive pads 115 and the battery cells 110 may be fixed to one another by a surface pressure applied from the exterior member 150. Therefore, the compressive pads 115 and the battery cells 110 may be stably fixed to one another without a separate bonding layer.

In addition, a bonding layer may be positioned between the compressive pad 115 and the battery cell 110. For example, the bonding layer may be configured as a bonding member such as a double-sided tape or a bonding agent. However, the bonding layer is not limited thereto, and any material may be applied as long as the material has bondability capable of fixing the battery cell 110 and the compressive pad 115.

Therefore, according to battery module 100 according to the present embodiment, the battery cell 110 and the compressive pad 115 may be bonded to each other, which makes it possible to further improve the rigidity and energy density of the battery cell stack 120 in the first direction (stacking direction).

FIG. 7 is a perspective view of a battery pack according to another embodiment of the present invention. FIG. 8 is an exploded perspective view of an upper pack frame of the battery pack in FIG. 7. FIG. 9 is an exploded perspective view of components of the battery pack in FIG. 7.

Referring to FIGS. 7 to 8, a battery pack 1000 according to another embodiment of the present invention includes the above-mentioned battery modules 100. Meanwhile, one or more battery modules 100 are packaged in the pack frames 1200 and 1300, thereby constituting the battery pack 1000.

More specifically, referring to FIG. 8, the lower pack frame 1300 includes a plurality of module regions in which the battery modules 100 are mounted. The plurality of module regions may be defined by a plurality of beams 1310 extending from one side of the lower pack frame 1300 toward the other side of the lower pack frame 1300. The plurality of beams 1310 may extend in a vertical or horizontal direction based on a proceeding direction of a device on which the battery pack 1000 is mounted. For example, the device may be a vehicle. The plurality of beams 1310 may extend in the vertical or horizontal direction based on a proceeding direction of the vehicle on which the battery pack 1000 is mounted.

In addition, referring to FIGS. 8 and 9, in the battery pack 1000 according to the present embodiment, thermally conductive resin layers 1340 may be respectively formed in the module regions defined by the plurality of beams 1310. For example, the thermally conductive resin layers 1340 may be respectively formed at positions corresponding to the battery modules 100 mounted in the module regions defined by the plurality of beams 1310.

For example, the thermally conductive resin layer 1340 may be formed by applying thermally conductive resin onto the lower pack frame 1300. That is, the thermally conductive resin layer 1340 may be formed by curing the thermally conductive resin applied in advance before the battery modules 100 are mounted in the module regions. Therefore, as the thermally conductive resin is cured, the lower surface of the battery module 100 and the lower pack frame 1300 may be stably fixed to each other. In addition, because a separate fixing member is not required, which makes it possible to improve the price competitiveness and increase the battery density.

FIG. 10 is a view illustrating a part of a cross-section taken along cutting line C-C in FIG. 7. FIG. 11 is an enlarged view of a part of FIG. 10.

Referring to FIGS. 9 and 10, in the battery pack 1000 according to the present embodiment, the lower surface of the battery cell stack 120 of the battery module 100 may be exposed, such that the lower surface of the battery cell stack 120 and the thermally conductive resin layer 1340 may be in contact with each other. Therefore, the heat generated in the battery cell stack 120 may be transferred directly to the thermally conductive resin layer 1340. Therefore, it is possible to further improve the performance in cooling the battery module 100 and improve the lifespan of the battery cell 110.

Referring to FIGS. 10 and 11, in the battery pack 1000 according to the present embodiment, an outer surface of the exterior member 150 of the battery module 100 may be in contact with the beam 1310. More specifically, the outer surface of the exterior member 150, which surrounds the two opposite lateral sides of the battery cell stack 120, may be in contact with the beams 1310. In this case, the beams 1310 may press the outer surface of the exterior member 150, which contacts with the beam 1310, against the deformation 110A in the width direction caused during the process of charging and discharging the battery pack 1000.

For example, the beam 1310 may be made of an elastic material. The elastic material may be at least any one of a steel material, such as a flat spring and a plastic injection-molded product material. However, the present invention is not limited thereto. Any material may be applied without limitation as long as the material may have elasticity capable of effectively absorbing external impact and sufficiently pressing the outer surface of the exterior member 150 of the battery module 100.

Therefore, according to the battery pack 1000 according to the present embodiment, the beams 1310 provide the elastic force to the two opposite lateral sides of the battery module 100 in the width direction of the battery module 100, i.e., the stacking direction of the battery cell stack 120. Therefore, it is possible to prevent swelling of the battery cell caused by the battery module 100 and improve the dimensional stability of the battery module.

The above-mentioned battery module and the battery pack including the battery module may be applied to various devices. Examples of such devices may include transportation means such as an electric bicycle, an electric vehicle, and a hybrid vehicle, but the present invention is not limited thereto, and may be applied to various devices that may use the battery module and the battery pack including the battery module. These configurations may also belong to the scope of the present invention.

Although preferred examples of the present invention have been described in detail hereinabove, the right scope of the present invention is not limited thereto, and many variations and modifications of those skilled in the art using the basic concept of the present invention, which is defined in the following claims, will also belong to the right scope of the present invention.

DESCRIPTION OF REFERENCE NUMERALS

100: Battery module
110: Battery cell
115: Compressive pad
120: Battery cell stack
150: Exterior member
170: Sensing block
1000: Battery pack
1200: Upper pack frame
1300: Lower pack frame
1310: Beam
1340: Thermally conductive resin layer

The invention claimed is:

1. A battery module comprising:
a battery cell stack including a plurality of battery cells stacked in a first direction;
an exterior member configured to surround a front side, a rear side and two opposite lateral sides of the battery cell stack; and
sensing blocks positioned at the front side and the rear side of the battery cell stack,
wherein an upper side and a lower side of the battery cell stack are exposed,
wherein the battery cell stack includes electrode leads extending from at least one of the front side and the rear side,
wherein the sensing blocks are positioned between the exterior member and the front side and the rear side of the battery cell stack,
wherein the two opposite lateral sides are the outermost surfaces of the battery cell stack based on the first direction, and
wherein the sensing blocks cover the at least one of the front and rear sides of the battery cell stack from which electrode leads protrude, respectively.

2. The battery module of claim 1, wherein:
an outer surface of the exterior member is exposed.

3. The battery module of claim 2, wherein:
a width of the exterior member is equal to or smaller than a width of the battery cell stack.

4. The battery module of claim 1, wherein:
the exterior member is positioned adjacent to a lower portion of the battery cell stack.

5. The battery module of claim 1, wherein:
the exterior member is made of an elastic material.

6. The battery module of claim 5, wherein:
the exterior member is formed by wrapping the front side, the rear side and the two opposite lateral sides of the battery cell stack with a film made of an elastic material.

7. The battery module of claim 5, wherein:
the exterior member is configured as a thermal contraction tube, and
the thermal contraction tube is opened at upper and lower sides thereof.

8. The battery module of claim 1, wherein:
compressive pads are positioned between the exterior member and the two opposite lateral sides of the battery cell stack.

9. The battery module of claim 8, wherein:
the compressive pads extend along the lateral side of the battery cell stack.

10. The battery module of claim 1, wherein:
the exterior member surrounds the battery cell stack while pressing the battery cell stack in a predetermined direction.

11. The battery module of claim 1, wherein:
an outer surface of the battery cell stack is attached to an inner surface of the exterior member.

12. A battery pack comprising:
a pack frame on which at least two battery modules according to claim 1 are mounted,
wherein the pack frame comprises:
a lower pack frame on which the at least two battery modules are mounted; and
an upper pack frame configured to cover upper portions of the at least two battery modules.

13. The battery pack of claim 12, wherein:
the lower pack frame comprises a plurality of module regions in which the at least two battery modules are mounted, and
the plurality of module regions is defined by a plurality of beams extending from a first side toward a second side of the lower pack frame.

14. The battery pack of claim 13, wherein:
an outer surface of the exterior member contacts with the beam.

15. The battery pack of claim 13, wherein:
thermally conductive resin layers are respectively formed in the module regions.

16. The battery pack of claim 15, wherein:
a lower surface of the battery cell stack contacts with the thermally conductive resin layer.

17. The battery module of claim 1, wherein:
the upper side and the lower side of the battery cell stack are completely exposed.

18. The battery module of claim 8, wherein:
the compressive pad is configured to assist the exterior member in pressing an outer surface of the battery cell stack.

* * * * *